(12) United States Patent
Niculescu-Mizil et al.

(10) Patent No.: US 10,853,937 B2
(45) Date of Patent: Dec. 1, 2020

(54) UNSUPERVISED IMAGE-BASED ANOMALY DETECTION USING MULTI-SCALE CONTEXT-DEPENDENT DEEP AUTOENCODING GAUSSIAN MIXTURE MODEL

(71) Applicant: NEC Laboratories America, Inc., Princeton, NJ (US)

(72) Inventors: Alexandru Niculescu-Mizil, Plainsboro, NJ (US); Renqiang Min, Princeton, NJ (US); Eric Cosatto, Red Bank, NJ (US); Farley Lai, Plainsboro, NJ (US); Hans Peter Graf, South Amboy, NJ (US); Xavier Fontaine, Paris (FR)

(73) Assignee: NEC CORPORATION (JP)

( * ) Notice: Subject to any disclaimer, the term of this patent is extended or adjusted under 35 U.S.C. 154(b) by 163 days.

(21) Appl. No.: 16/248,955

(22) Filed: Jan. 16, 2019

(65) Prior Publication Data
US 2019/0244337 A1    Aug. 8, 2019

Related U.S. Application Data

(63) Continuation of application No. 16/248,897, filed on Jan. 16, 2019.
(Continued)

(51) Int. Cl.
*G06K 9/00* (2006.01)
*G06T 7/00* (2017.01)
(Continued)

(52) U.S. Cl.
CPC ............ *G06T 7/001* (2013.01); *G06K 9/4604* (2013.01); *G06K 9/4628* (2013.01);
(Continued)

(58) Field of Classification Search
CPC ............ G06K 2209/19; G06K 9/4604; G06K 9/4628; G06K 9/4671; G06K 9/6256;
(Continued)

(56) References Cited

U.S. PATENT DOCUMENTS

| | | | |
|---|---|---|---|
| 2002/0168099 A1* | 11/2002 | Noy ...................... | G06T 7/0002 382/149 |
| 2004/0218806 A1* | 11/2004 | Miyamoto ............ | G06T 7/0004 382/145 |

(Continued)

OTHER PUBLICATIONS

Pietraszek, T., "Using Adaptive Alert Classification to Reduce False Positives in Intrusion Detection", RAID 2004. Lecture Notes in Computer Science, Springer Berlin/Heidelberg, 2004, Sep. 2004, pp. 102-124. vol. 3224.

(Continued)

*Primary Examiner* — Xin Jia
(74) *Attorney, Agent, or Firm* — Joseph Kolodka

(57) ABSTRACT

A false alarm reduction system is provided that includes a processor cropping each input image at randomly chosen positions to form cropped images of a same size at different scales in different contexts. The system further includes a CONDA-GMM, having a first and a second conditional deep autoencoder for respectively (i) taking each cropped image without a respective center block as input for measuring a discrepancy between a reconstructed and a target center block, and (ii) taking an entirety of cropped images with the target center block. The CONDA-GMM constructs density estimates based on reconstruction error features and low-dimensional embedding representations derived from image encodings. The processor determines an anomaly existence based on a prediction of a likelihood of the anomaly existing in a framework of a CGMM, given the (Continued)

context being a representation of the cropped image with the center block removed and having a discrepancy above a threshold.

20 Claims, 9 Drawing Sheets

Related U.S. Application Data

(60) Provisional application No. 62/642,050, filed on Mar. 13, 2018, provisional application No. 62/626,308, filed on Feb. 5, 2018.

(51) Int. Cl.
*G08B 29/18* (2006.01)
*G06K 9/62* (2006.01)
*G06K 9/46* (2006.01)
*G06T 3/40* (2006.01)

(52) U.S. Cl.
CPC ......... *G06K 9/4671* (2013.01); *G06K 9/6256* (2013.01); *G06K 9/6273* (2013.01); *G06K 9/6284* (2013.01); *G06T 3/403* (2013.01); *G06T 7/0004* (2013.01); *G08B 29/186* (2013.01); *G06K 2209/19* (2013.01); *G06T 2207/20081* (2013.01); *G06T 2207/20084* (2013.01)

(58) Field of Classification Search
CPC ................ G06K 9/6273; G06K 9/6284; G06T 2207/20081; G06T 2207/20084; G06T 3/403; G06T 7/0004; G06T 7/001; G08B 29/186
See application file for complete search history.

(56) References Cited

U.S. PATENT DOCUMENTS

2016/0267806 A1* 9/2016 Hsu .................... B23K 9/32
2018/0101167 A1* 4/2018 DehghanNiri ....... G01N 29/043

OTHER PUBLICATIONS

Chandola et al., "Anomaly Detection: A Survey" ACM Comput. Surv., Article 15, Jul. 2009, 58 pages, 41, 3, 68 pages.
Zhou et al., "Anomaly Detection with Robust Deep Autoencoders", KDD'17, Aug. 2017, pp. 665-674.

* cited by examiner

UNSUPERVISED IMAGE-BASED ANOMALY DETECTION USING MULTI-SCALE CONTEXT-DEPENDENT DEEP AUTOENCODING GAUSSIAN MIXTURE MODEL

RELATED APPLICATION INFORMATION

This application claims priority to U.S. Prov. Pat App. Ser. No. 62/642,050 filed on Mar. 13, 2018, and U.S. Prov. Pat App. Ser. No. 62/626,308 filed on Feb. 5, 2018, incorporated herein by reference herein in their entireties.

BACKGROUND

Technical Field

The present invention relates to quality control and more particularly to unsupervised image-based anomaly detection using a multi-scale context-dependent deep autoencoding Gaussian Mixture Model.

Description of the Related Art

Automatic Manufacturing Quality Control (AMQC) systems analyze images of manufactured items to identify defects and anomalies. When an AMQC system makes a detection (i.e., it believes that it has identified a defect), a follow-up action must be taken (e.g. the item is discarded, or the production line is stopped, or an operator must further inspect the item). The follow-up action incurs a cost (e.g., the cost of the discarded item, or the loss in production time from stopping a line, or the time of the operator that must perform the additional inspection). In the case of false alarms, the follow-up cost is simply wasted. Hence, a false alarm reduction system is necessary for automatic manufacturing quality control.

SUMMARY

According to an aspect of the present invention, a false alarm reduction system is provided for reducing false alarms in an automatic defect detection system. The false alarm reduction system includes a processor for performing a cropping operation on each of input images at randomly chosen positions to form a set of cropped images of a same size at different scales in different contexts. The false alarm reduction system further includes a CONtext-conditional Deep Autoencoding Gaussian Mixture Model (CONDA-GMM), having a first and a second conditional deep autoencoder for respectively (i) taking each of the cropped images without a respective center block as input for measuring a discrepancy between a reconstructed center block and the target center block, and (ii) taking an entirety of the cropped images with the target center block. The CONDA-GMM constructs density estimates based on both reconstruction error features and low-dimensional embedding representations derived from encodings of the cropped images. The processor determines an existence of an anomaly based on a prediction of a likelihood of the anomaly existing in a framework of a context-dependent Conditional Gaussian Mixture Model (CGMM), given the context being a representation of the cropped image with the center block removed and having a discrepancy above a threshold amount.

According to another aspect of the present invention, a false alarm reduction method is provided for reducing false alarms in an automatic defect detection system. The false alarm reduction method including performing, by a processor, a cropping operation on each of input images at randomly chosen positions to form a set of cropped images of a same size at different scales in different contexts. The false alarm reduction method further includes encoding, by a first conditional deep autoencoder of a CONtext-conditional Deep Autoencoding Gaussian Mixture Model (CONDA-GMM), each of the cropped images without a respective center block as input for measuring a discrepancy between a reconstructed center block and the target center block. The false alarm reduction method also includes encoding, by a second conditional deep autoencoder of the CONDA-GMM, an entirety of the cropped images with the target center block. The false alarm reduction method additionally includes constructing, by the CONDA-GMM, density estimates based on both reconstruction error features and low-dimensional embedding representations derived from encodings of the cropped images. The false alarm reduction method further includes determining, by the processor, an existence of an anomaly based on a prediction of a likelihood of the anomaly existing in a framework of a context-dependent Conditional Gaussian Mixture Model (CGMM), given the context being a representation of the cropped image with the center block removed and having a discrepancy above a threshold amount.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to unsupervised image-based anomaly detection using a multi-scale context-dependent deep autoencoding Gaussian Mixture Model.

One or more embodiments of the present invention attempt to reduce the false alarms from an AMQC system (detections that are not real defects), eliminating the cost of follow-up actions associated with these false alarms.

An added challenge is to achieve a reduction in false alarms without having access to defective or anomalous items. This is important in many applications where examples of defective items are scarce or nonexistent (e.g., because defects appear very rarely) or defects are too varied (e.g., when there are no "typical" defects).

Figure 1:
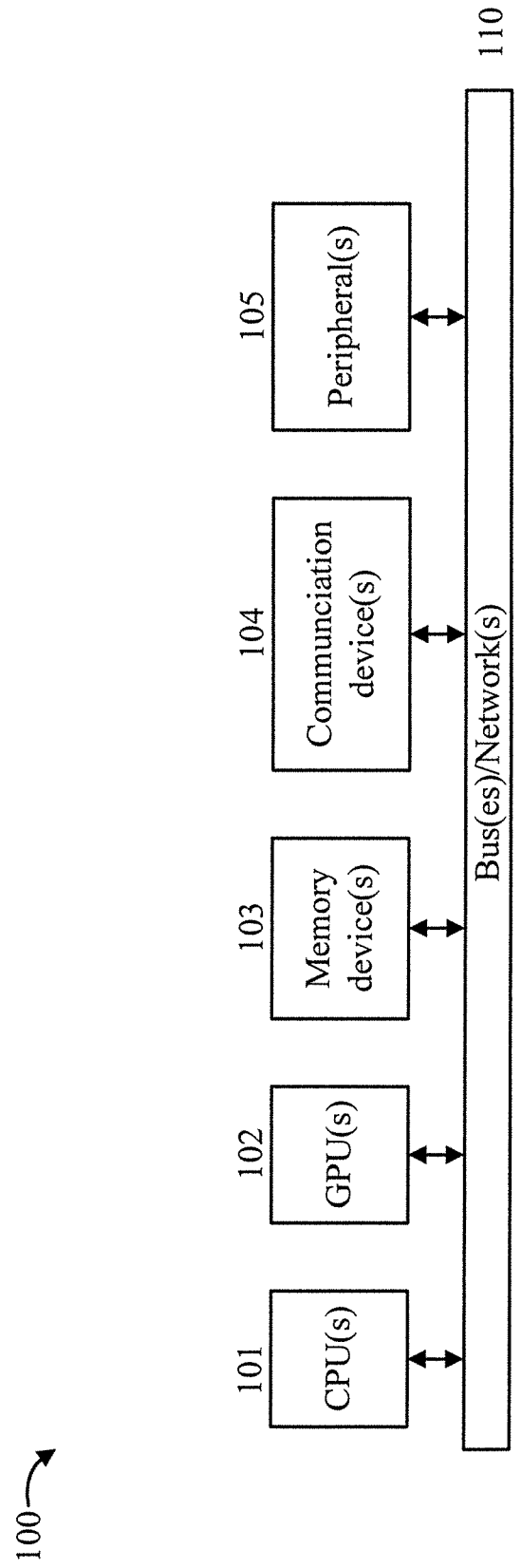
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., Wi-Fi, Bluetooth adapters and etc.). The peripherals 105 can include a display device, a user input device, a printer, an imaging device, and so forth. Elements of processing system 100 are connected by one or more buses or networks (collectively denoted by the figure reference number 110).

Of course, the processing system 100 may also include other elements (not shown), as readily contemplated by one skill in the art, as well as omit certain components. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used. These and other variations of the processing system 100 are readily contemplated by one of ordinary skill in the art given the teachings of the present invention provided herein.

Moreover, it is to be appreciated that various figures as described above with respect to various elements and steps relating to the present invention that may be implemented, in whole or in part, by one or more of the components of system 100. Moreover, one or more components of system 100 may be used to control one or more components of the various architectures described herein.

The AMQC false alarm reduction system uses a machine learning approach to train a one-class classifier to recognize typical false alarms produced by an AMQC system, or to train a binary or multi-class classifier to discriminate between typical false alarms and true defects. Once the model is trained, the model can be applied in production to identify and eliminate false alarms.

Figure 2:
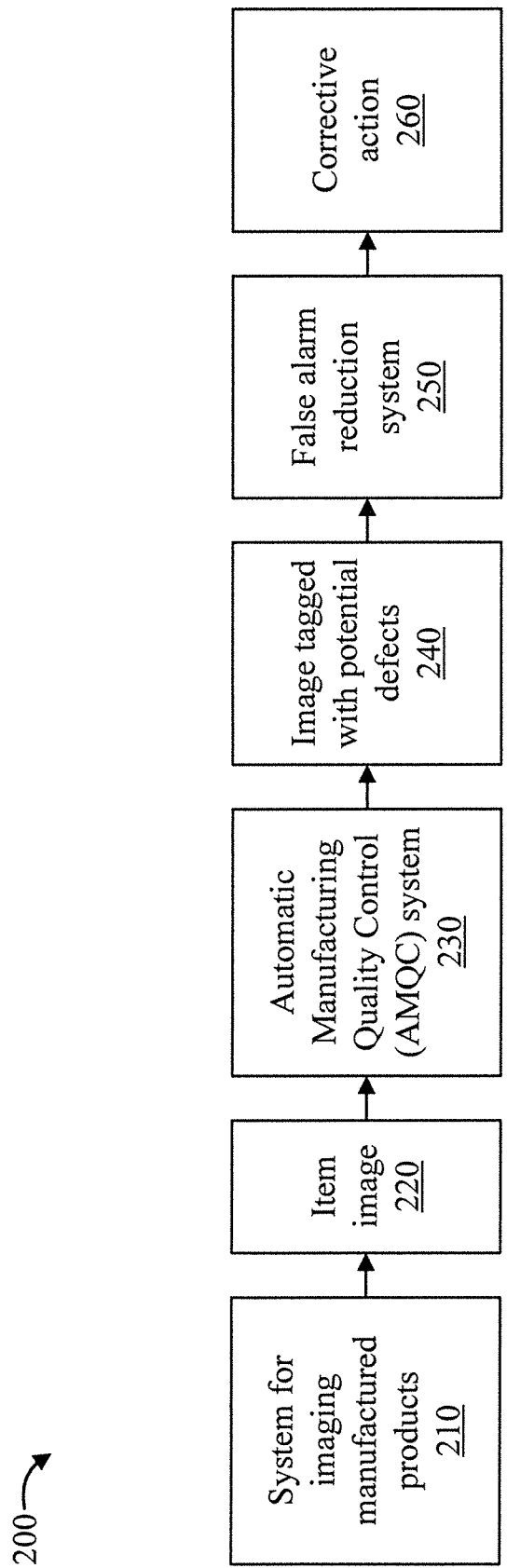
FIG. 2 is a block diagram showing an exemplary false alarm reduction system for automatic manufacturing quality control, in accordance with an embodiment of the present invention.

FIG. 2 is a block diagram showing an exemplary false alarm reduction system 200 for automatic manufacturing quality control, in accordance with an embodiment of the present invention. In an embodiment, system 200 is part of an Automatic Manufacturing Quality Control (AMQC) system 230. In another embodiment, the system 200 is operatively coupled to a AMQC system 230.

An imaging system 210 produces images or video of manufactured products 220. The images are processed by the Automatic Manufacturing Quality Control (AMQC) system 230. The AMQC system identifies potential defects and anomalies and tags. The tagged potential defects 240 are further analyzed by the false alarm reduction system 250 to eliminate false alarms. Alarms that are not eliminated by the false alarm reduction system may be further evaluated by an operator, or corrective action 260 can be automatically triggered (e.g., discarding the product, replacing a defective one with a subsequent non-defective one, stopping the production line, and so forth).

The elements of FIG. 2 can be implemented by hardware (e.g., ASICs, etc.), software, or a combination thereof. For example, hardware such as a camera, processor, memory and so forth can be used with software to realize system 200. These and other implementations of the elements of system 200 are readily determined by one of ordinary skill in the art given the teachings of the present invention provided herein, while maintaining the spirit of the present invention.

Figure 3:
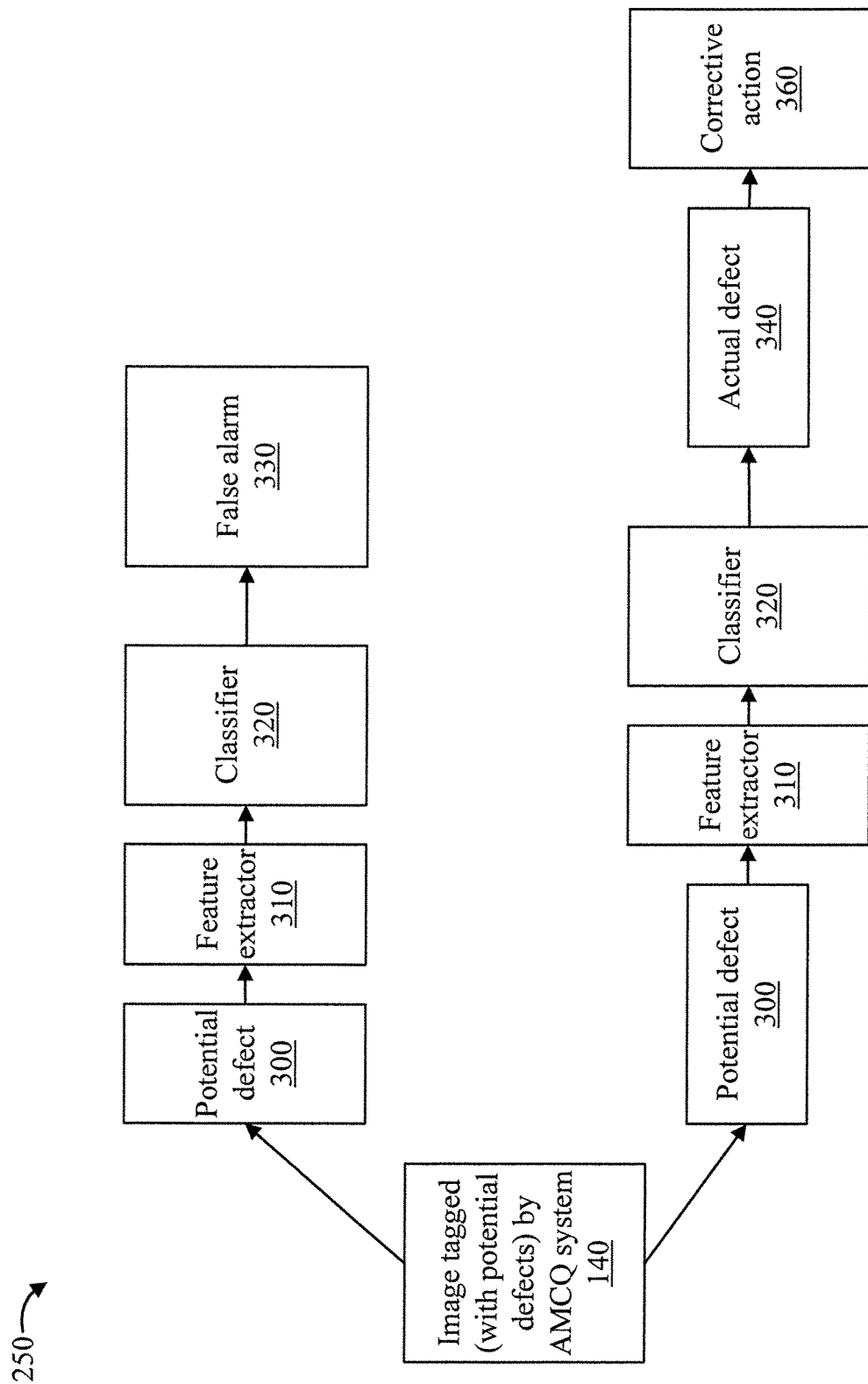
FIG. 3 is a block diagram further showing the false alarm reduction system of FIG. 2, in accordance with an embodiment of the present invention.

FIG. 3 is a block diagram further showing the false alarm reduction system 250 of FIG. 2, in accordance with an embodiment of the present invention.

The false alarm reduction system 250 includes a feature extractor 310 and a classifier 320. The False Alarm Reduction system receives an image 240 tagged with one or more potential defects 300 by the AMQC system. The region around each potential defect 300 is cropped and passed to the feature extractor 310. The feature extractor 310 generates a feature representation from variable sized image patches. In possible embodiments, the feature extractor 310 may calculate Histograms of Gradients (HOG) features, Scale Invariant Feature Transform (SIFT) features, and/or features from intermediate layers of deep networks. The feature representation is then passed to a classifier 320 that decides whether the potential defect 300 is a false alarm 330 or an actual defect 340. The classifier 320 might be a one-class classifier if examples of true defects are not available, too few, or not representative of all the defects that might be encountered. In possible embodiments, the one-class classifiers might be one-class SVMs, Nearest Neighbor (NN) classifiers, density estimation or energy-based classifiers. If sufficient and representative examples of true defects are available, then a possible embodiment may use binary or multi-class classifiers to discriminate between false alarms and true defects. Examples of true defects may be obtained by operating the AMQC system without using a false alarm reduction system for a period of time. Potential defects 300 that are NOT deemed to be false alarms by the classifier (i.e., that are deemed actual defects 340) are submitted for further analysis by an operator, or trigger corrective action 260.

The components of FIG. 3 can be implemented by hardware (e.g., ASICs, etc.), software, or a combination thereof. For example, hardware such as a camera, processor, memory and so forth can be used with software to realize system 300. These and other implementations of the components of false alarm reduction system 250 are readily determined by one of ordinary skills in the art given the teachings of the present invention provided herein, while maintaining the spirit of the present invention.

Figure 4:
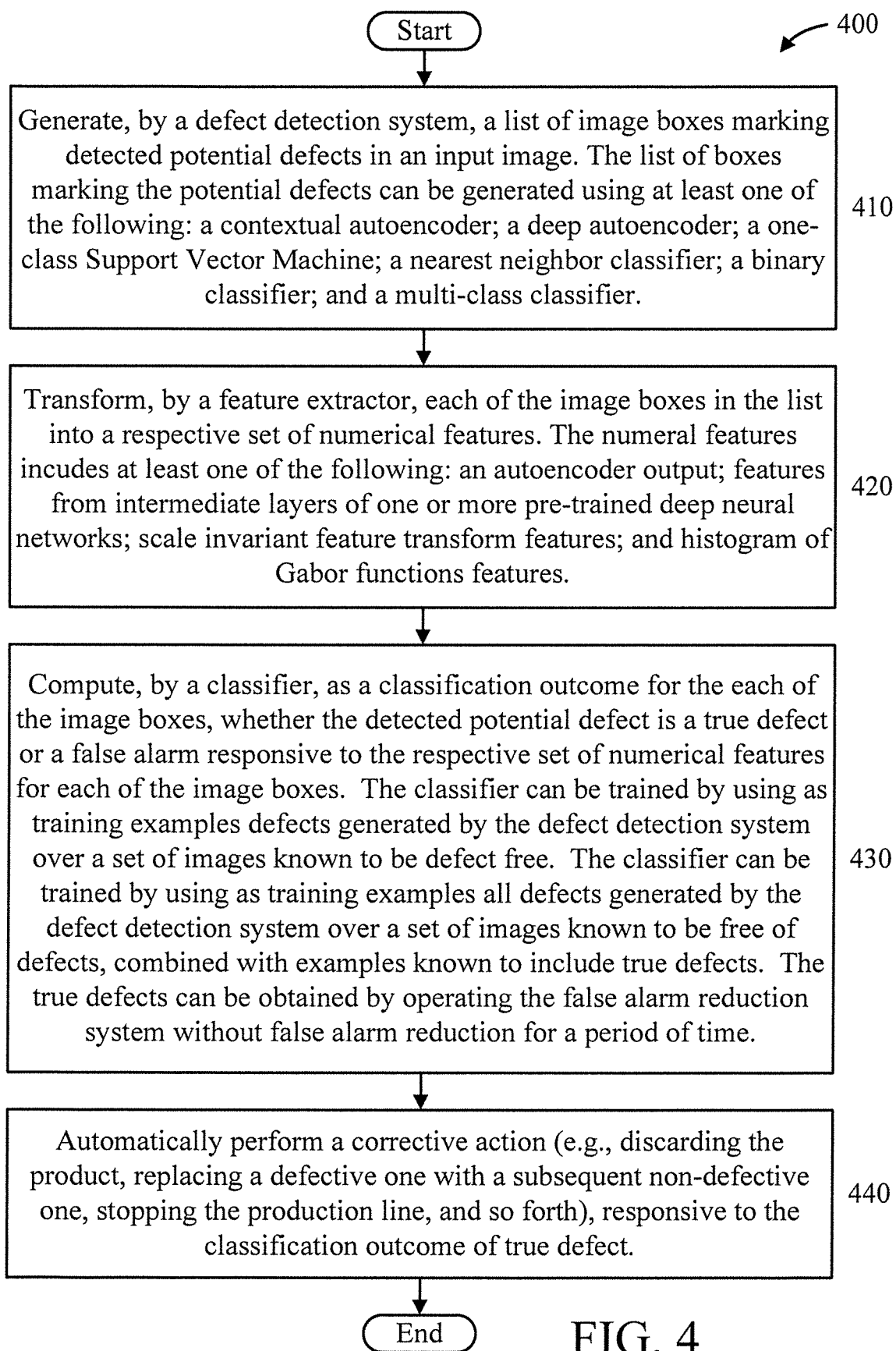
FIG. 4 is a flow diagram showing an exemplary method for false alarm reduction for automatic manufacturing quality control, in accordance with an embodiment of the present invention.

FIG. 4 is a flow diagram showing an exemplary method 400 for false alarm reduction for automatic manufacturing quality control, in accordance with an embodiment of the present invention.

At block 410, generate, by a defect detection system, a list of image boxes marking detected potential defects in an input image. In an embodiment, the list of boxes marking the potential defects can be generated using at least one of the following: a contextual autoencoder; a deep autoencoder; a one-class Support Vector Machine; a nearest neighbor classifier; a binary classifier; and a multi-class classifier.

At block 420, transform, by a feature extractor, each of the image boxes in the list into a respective set of numerical features. In an embodiment, the numeral features includes at least one of the following: autoencoder output; features from intermediate layers of one or more pre-trained deep neural networks; scale invariant feature transform features; and histogram of Gabor functions features.

At block 430, compute, by a classifier, as a classification outcome for the each of the image boxes, whether the detected potential defect is a true defect or a false alarm responsive to the respective set of numerical features for each of the image boxes. In an embodiment, the classifier can be trained by using as training examples defects generated by the defect detection system over a set of images known to be defect free. In an embodiment, the classifier can be trained by using as training examples all defects generated by the defect detection system over a set of images known to be free of defects, combined with examples known to include true defects. In an embodiment, the true defects can be obtained by operating the false alarm reduction system without false alarm reduction for a period of time.

In an embodiment, the classifier can compute the classification outcome using a one-class classifier. In an embodiment, the one-class classifier can be, for example, a one-class Support Vector Machine classifier and/or a Nearest-Neighbor classifier. In an embodiment, the classifier includes a Support Vector Machine and/or a deep neural network. In an embodiment, the classifier can compute the classification outcome using a binary classifier and/or a multi-class classifier.

At block 440, automatically perform a corrective action (e.g., discarding the product, replacing a defective one with a subsequent non-defective one, stopping the production line, and so forth), responsive to the classification outcome of true defects.

Further descriptions will now be given regarding various aspects of the present invention. For the sake of illustration, the same may be provided with respect to a scenario involving detecting defects in tires. Accordingly, some of the further descriptions may be so described in terms of the example relating to tire defects. However, it is to be appreciated that the present invention can be applied to any type of defect in an image, as readily appreciated by one of ordinary skill in the art given the teachings of the present invention provided herein, while maintaining the spirit of the present invention.

A further description will now be given regarding an autoencoder that can be part of the AMQC.

Figure 5:
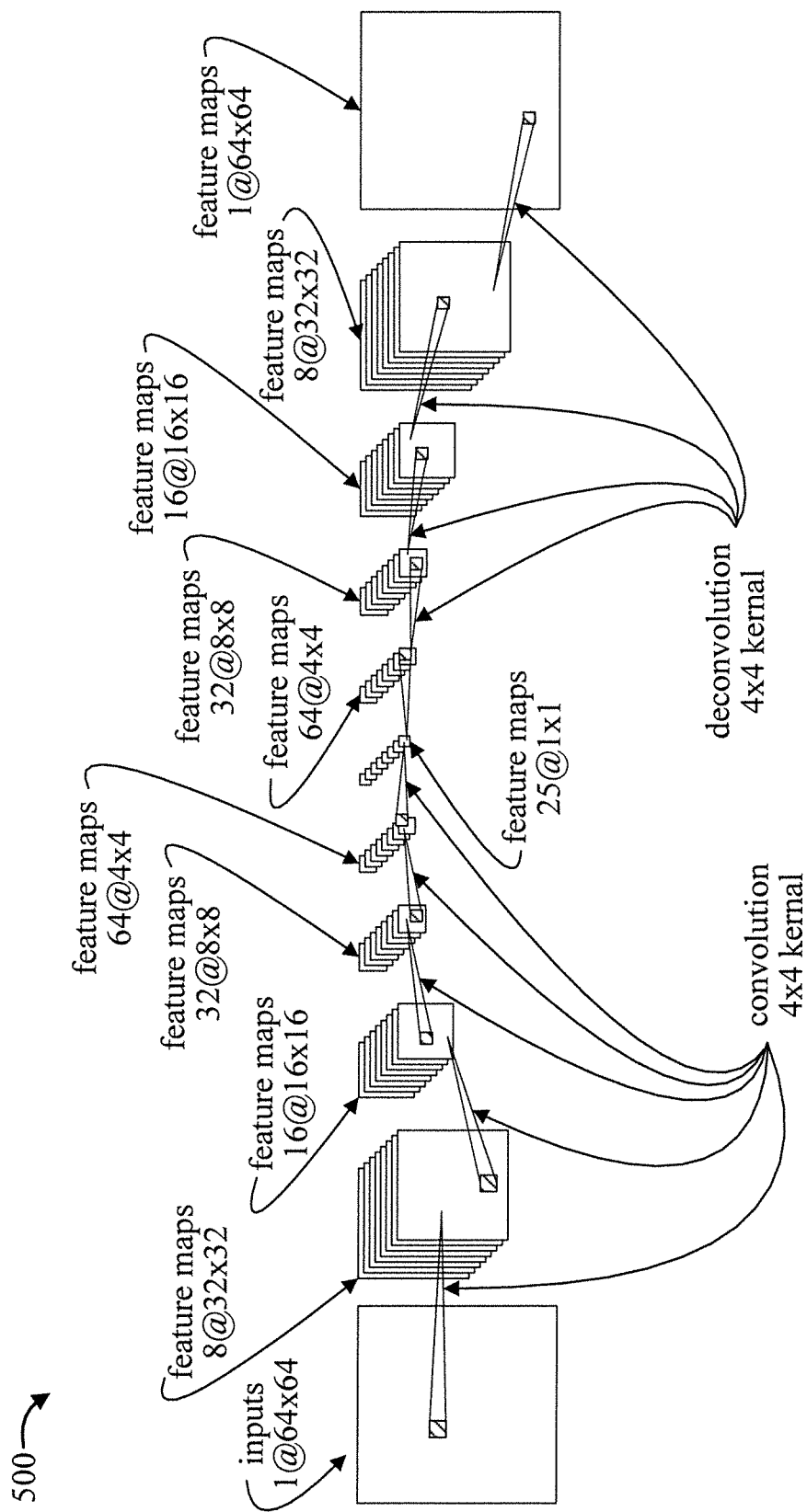
FIG. 5 shows an exemplary autoencoder architecture to which the present invention can be applied, in accordance with an embodiment of the present invention.

Since we are working on images, we decided to use a convolutional autoencoder which is particularly suited to learn image features. FIG. 5 shows an exemplary autoencoder architecture 500 to which the present invention can be applied, in accordance with an embodiment of the present invention.

A further description will now be given regarding handling false positives, in accordance with an embodiment of the present invention.

During the detection process, an issue can be the high number of false positives that occur at the same time. Moreover, if we want to detect most of the defects (i.e. increase the recall) we have to lower the threshold, which naturally leads to an increase of the quantity of false positives.

If the AMCQ system tags a potential defect on an image that is known to be non-defective, then the tagged defect must be a false positive. We can therefore gather a set of false defects by taking all the potential defects tagged by the AMCQ system on images of non-defective products. Since we cannot gather a set of true defects (we do not have labeled images for training or validation) we will have to use an unsupervised classifier, such as a one-class SVM or a nearest neighbor classifier. However, before discussing the different unsupervised classifiers we could use, we need to be able to extract features from the bounding boxes images.

A description will now be given regarding feature extraction, in accordance with an embodiment of the present invention.

The first step in the design of our bounding-box classifier is to create a dataset including examples of false defects (as we have already said that we cannot gather examples of true defects). In order to do that, we run the defect detection algorithm on the images of the validation dataset.

All these images are pictures of good products and therefore are not supposed to include any defect. All the bounding boxes returned by the AMCQ system therefore to false positives. However, there can be several possible complications. First of all, the bounding boxes do not have the same dimensions. We can have very big defects and small ones, horizontal or vertical defects. Since we want to be able to compare these bounding boxes with one another we need to use bounding boxes of the same size. One solution could be to resize and rescale each bounding box to some fixed size. However, this can alter a lot the appearance of the image inside a bounding box and introduce scaling issues. Therefore, we choose to use a simpler method which includes extracting a 64 by 64 square image centered in the center of all the bounding boxes. This allows us to have images of the same size in our dataset. The other question to answer is the features we will use to represent these 64 by 64 images in our classifier. We could use the raw pixel values but this may result in a less robust classifier. In order to get a more robust system we have to extract meaningful features from these images. We tried to use handcrafted features, such as Local Binary Patterns (LPB) or Histograms of Gradients (HOG), which gave better results than the raw pixel values. Nevertheless, these features were not ideal and we ended up using deep learning to obtain better features.

We investigated two different methods using deep learning to create features that represent the possible defects. The first one is to use the latent representation of the bottleneck of an autoencoder as features. Therefore, we can use an autoencoder. Its bottleneck includes compressed information about the input image given to the network: the output vector of the encoder is indeed used as input to the decoder to reconstruct the image and can therefore be seen as a good feature vector. There is still an issue with this method: the bottleneck contains very local information about the input image (since it is used to reconstruct it precisely) and, for example, a translation can create very different bottleneck representations. We found out experimentally that the distance between the bottleneck representations of two translated images is larger than the average distance between bottleneck vectors. Therefore, the use of an autoencoder does not seem suited for our problem because we want to find a feature extractor that preserves the content similarity (and not the pixel-wise similarity) between two images. But once again we face the problem that our data are unlabeled, making it difficult to train a custom feature extractor.

In another possible embodiment, an existing convolutional neural network trained on a large database of images can be used to extract features. Such a neural network is trained in a supervised manner and learns features to distinguish and classify objects in images. The features learned in the last layers are probably too complex and too specific for what we need. Indeed, we are not interested in the high level features characterizing a dog or a horse learned by a convolutional neural network, but rather simpler patterns like hatched regions, lines, blobs, etc. Therefore, we need to chop the network and to use only the first layers that are known to learn simple features. More precisely we chose to use a network with 34 convolutional layers and to use the first 7 convolutional layers. Feeding a 64 by 64 image into this chopped network gives a 128 by 8 by 8 output tensor, which is flattened and normalized to obtain a 8192-dimensional feature vector.

We feed the chopped network with all the bounding boxes of defects from the validation set to create a new training set of 8192-dimensional vectors representing False Positives. In order to increase the representational power of this dataset, we use data augmentation to create more examples: each bounding box is horizontally flipped (mirrored) to create a new image whose features are computed and added to the dataset. With this data augmentation technique, we double the size of the dataset which contains therefore around 10,000 images. The actual precise size of the dataset depends on the value of the threshold we used during defect detection.

A description will now be given regarding the false positive classifier, in accordance with an embodiment of the present invention.

Now that we have a dataset containing a feature representation of false defects, we can train an unsupervised classifier on it. The most natural approach to handling this one-class classification task is to use a One-class SVM. We train a One-class SVM with a radial basis function (RBF) kernel on the dataset of false positives. The One-class SVM learns a decision function which encloses the training data into one subspace. This algorithm requires training to learn the decision boundary and the evaluation phase is fast since the One-class SVM has just to find on which side of the boundary an example lies. We trained several instances of One-class SVM with different values of its parameters (which control how tight to the training examples the decision boundary should be).

In another embodiment, a modified version of a Nearest Neighbor classifier may be used to perform classification on this dataset. In order to classify a candidate defect extracted from a test image, we search the training set for the closest image to this candidate defect. If its distance is smaller than a certain threshold t, the image is considered to be a false defect. Otherwise it is classified as a defective patch. We make here the assumption that the training dataset contains representatives for every possible false positive that we can encounter. This hypothesis is reasonable because of the high similarity between the product images. If a candidate defect image is far from all the images in the training set it is likely that it contains some strange or new pattern which is the mark of a defect. We use the $\ell^2$ norm between the feature representations of the bounding boxes to compute the distance between two images. We use the power of tensor computations of our GPU to compute efficiently the minimum distance of a candidate image to the training set. This results in a fast system: there is no real training phase because we only need to create a matrix with the feature representations of all the false positives. The test phase includes, for each image, computing its feature representation, then the distances to all the elements in the training matrix and thereafter keeping the smallest one. Classifying a candidate defect as a true or false defect is thus very fast.

A description will now be given of some of the many attendant advantages of the present invention.

The value of the solution is that it reduces the number of false alarms from an AMQC system, thus eliminating the cost of unnecessary follow-up actions (e.g., the cost of the discarding an item that was not defective, or the loss in production time from stopping a line, or the time of the operator that must perform an unneeded inspections). An added value of the proposed solution is that it is applicable in situations where manufacturing defects and anomalies occur rarely, or when corporations do not desire or intend to share (or even admit) the existence of defective items.

A description will now be given regarding one or more embodiments directed to an unsupervised image-based anomaly detection system using a multi-scale context-dependent deep autoencoding Gaussian Mixture Model (GMM).

Anomaly detection plays a key role in industrial manufacturing for quality control. Given a sufficient number of pictures of normal manufacturing products taken in an assembly line, we want to develop a software system that automatically detects which products are anomalous. Since anomalous products are often rare and can occur in various ways, supervised learning techniques often readily over-fit training datasets and cannot generalize to unseen anomalies. Therefore, unsupervised anomaly detection systems are much more useful in practice. In accordance with one or more embodiments of the present invention, an unsupervised anomaly detection system is provided that uses a multi-scale context-dependent deep autoencoding Gaussian Mixture Model for image-based quality control of manufacturing products.

Figure 6:
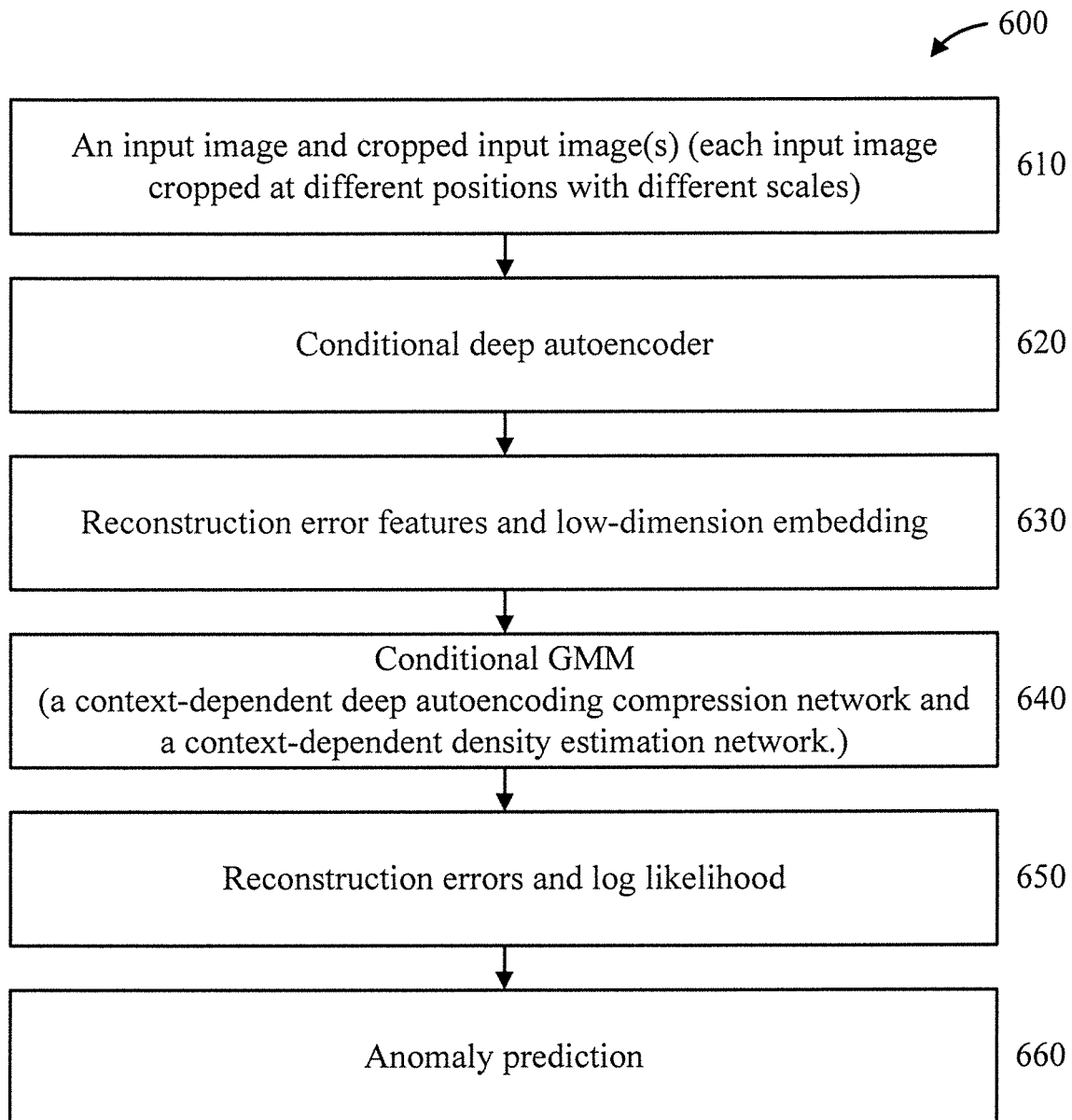
FIG. 6 is a flow diagram showing the process of an exemplary unsupervised image-based anomaly detection system using a multi-scale context-dependent deep autoencoding Gaussian Mixture Model (GMM), in accordance with an embodiment of the present invention.

FIG. 6 is a flow diagram showing an exemplary unsupervised image-based anomaly detection system/method 600 using a multi-scale context-dependent deep autoencoding Gaussian Mixture Model (GMM), in accordance with an embodiment of the present invention.

The system/method 600 involves an input image and a set of cropped input images 610, where each input image in the set is cropped at different positions with different scales.

The system/method 600 further involves a conditional deep autoencoder for providing reconstruction error features and a low-dimension embedding 630 to a conditional GMM 640. The conditional GMM 640 includes a context-dependent deep autoencoding compression network and a context-dependent density estimation network. The conditional GMM 640 density models both reconstruction errors and log likelihood 650, which are then used for anomaly prediction 660.

Figure 7:
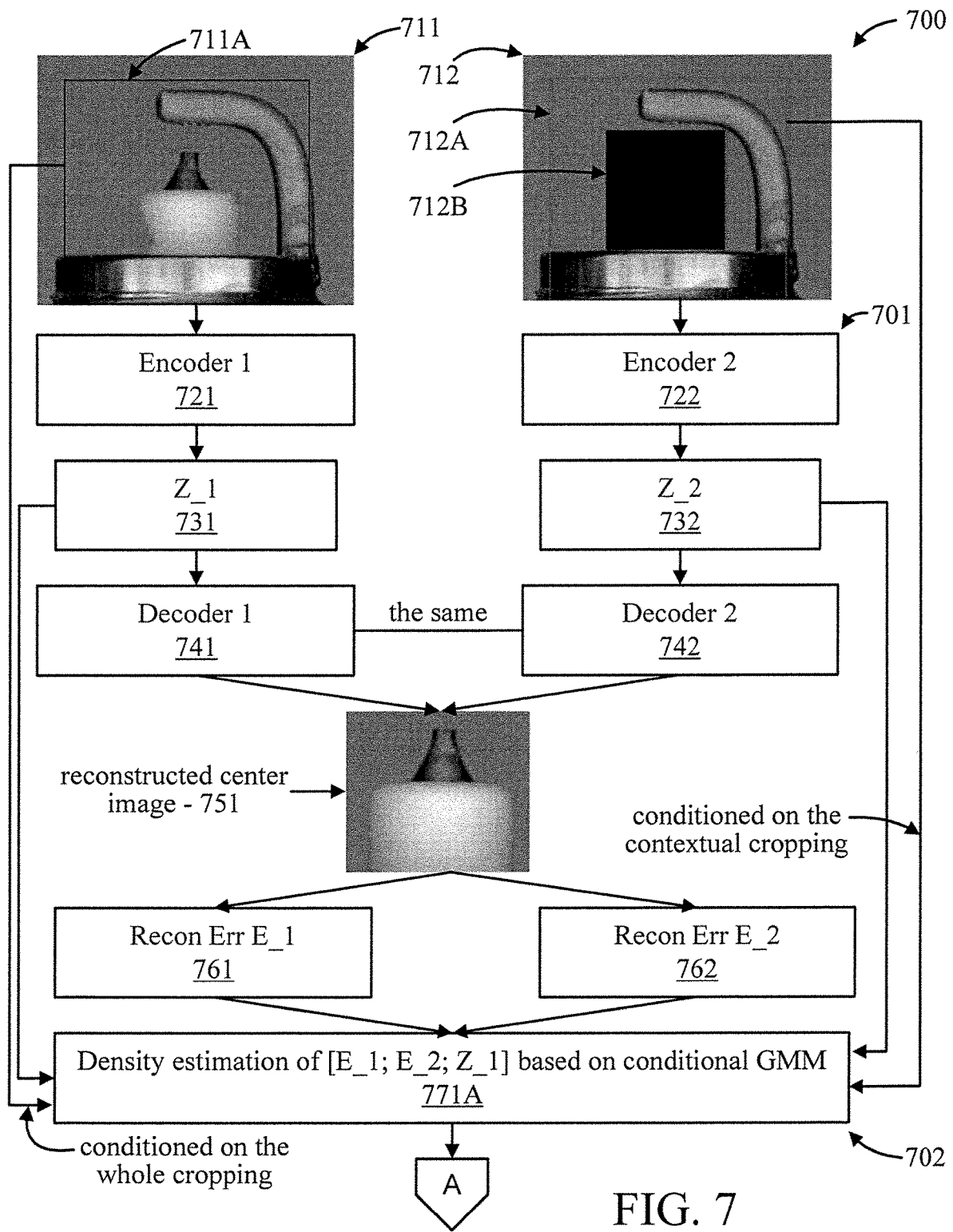
FIGS. 7-8 are high-level block diagrams showing the architecture of an exemplary unsupervised image-based anomaly detection system using a multi-scale context-dependent deep autoencoding Gaussian Mixture Model (GMM), in accordance with an embodiment of the present invention.
Figure 8:
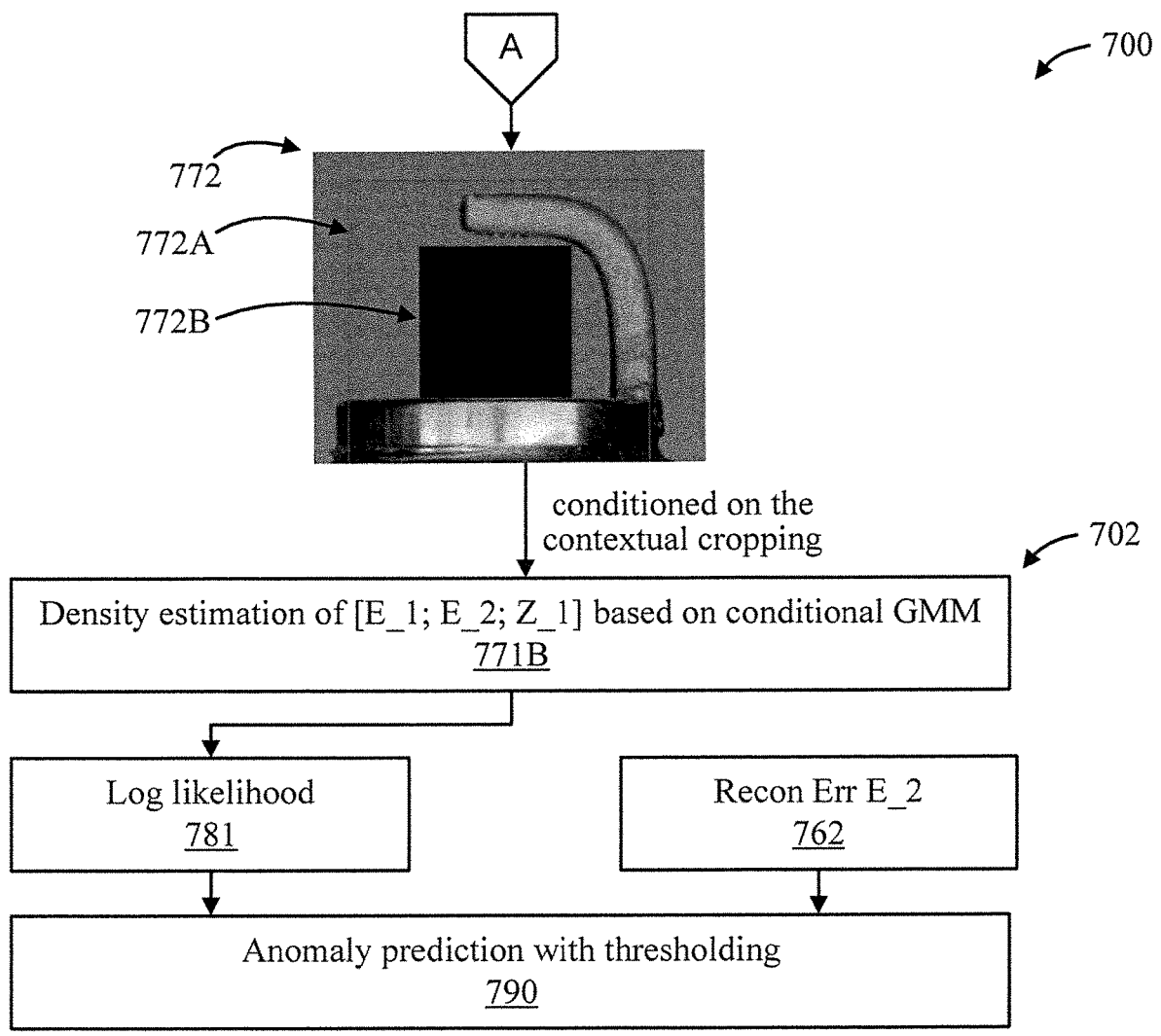

FIGS. 7-8 are high-level block diagrams showing an exemplary unsupervised image-based anomaly detection system/method 700 using a multi-scale context-dependent deep autoencoding Gaussian Mixture Model (GMM), in accordance with an embodiment of the present invention. FIGS. 7-8 provide additional details relative to the embodiment of FIG. 6.

Our proposed approach involves a CONtext-conditional Deep Autoencoding Gaussian Mixture Model (CONDA-GMM) which includes the following two major components: a context-dependent deep autoencoding compression network 701; and a context-dependent density estimation network 702. CONDA-GMM works as follows: (1) an original input image 711 and one of the several croppings 712 of the same size with different scales performed at a randomly chosen position 711A and 712A of each given input image are used for subsequent processing, and SIFT features or other image features such as raw pixel values or edges for each cropped image without the center block 712B are used as part of the cropping-specific contextual vector; each input image can be cropped at many different positions; (2) the compression network 701 performs dimensionality reduction, respectively, for the whole cropped image and a cropped image without the center block 712, generates the corresponding low-dimensional representations, respectively, Z_1 731 and Z_2 732, and use the same decoder (Decoder 1 741 and Decoder 2 742) to reconstruct the center block, producing both the low-dimensional latent code Z_1 of the whole cropped image and the reconstruction error features Recon Err E_1 761 and Recon Err E_2 762 for the center block with different encoder inputs, and feeds the combined representations [E_1; E_2; Z_1] to the subsequent context-dependent density estimation network 702 for density estimation based on conditional GMM 771; in specific, the conditional deep autoencoder has two different types of encoders: encoder 1 721 takes the cropped image including the center block as input for learning the latent representation Z_1 of the whole input image, and encoder 2 722 takes the input image without the center block as input for better measuring the discrepancy between reconstructed center block and the target center block; (3) the context-dependent density estimation network 702 takes the feed, and predicts their likelihood/energy in the framework of context-dependent Conditional Gaussian Mixture Model (CGMM), given the context being the representation of the cropped image with the center block removed. In practice, we combine contextual vectors computed in step (1) and bottleneck-layer representations from the encoder network that takes the context image with the center block cropped as input computed in step (2) as the context representation to be conditioned in the CGMM.

As used herein, the term "low-dimensional" refers to a number of dimensions below a particular threshold number. In an embodiment, the threshold can be, for example, but is not limited to 50.

The low-dimensional representation provided by the compression network includes two sources of features: (1) the reduced low-dimensional representations learned by a context-dependent deep autoencoder; and (2) the features derived from the reconstruction error. Given a center image block x (712B) conditioned on its surrounding context c and the whole cropped image x' including x and c, the compression network computes its low-dimensional representation z as follows.

$$z\_c = h(x|c, x'); \quad x0 = g(z\_c|c); \tag{1}$$

$$z\_r = f(x; x0); \tag{2}$$

$$z = [z\_c; z\_r]; \tag{3}$$

where z_c, which corresponds to Z_1 731 and Z_2 732 in FIG. 7, is the reduced low-dimensional representation learned by the deep autoencoder, z_r, which corresponds to E_1 761 and E_2 762 in FIG. 7, includes the features derived from the reconstruction errors including two types of reconstruction errors from the two different encoders 721 and 722 in FIG. 7, x0 is the reconstructed counterpart of x, h( ) denotes the encoding function including 721 and 722, go denotes the decoding function including 741 and 742 in FIG. 7, and f( ) denotes the function of calculating reconstruction error features, in which the context c can be utilized in different ways such as simple concatenations. In this invention, the convolutional kernel filters in f( ) and the transposed-convolutional kernel filters in g( ) are learned from the context representations using a meta network that takes c as input. In particular, z_r can be multi-dimensional, considering multiple distance metrics such as absolute Euclidean distance, relative Euclidean distance, cosine similarity, and so on.

This paragraph describes the block 771 (771A in FIGS. 7 and 771B in FIG. 8) in detail. Given the low-dimensional representations for context-dependent center block images, the estimation network performs density estimation under the framework of CGMM. In the training phase with unknown mixture coefficient φ, mixture component mean μ, and mixture covariance σ, the estimation network estimates the parameters of CGMM and evaluates the likelihood/energy for input samples without alternating procedures such as the standard EM algorithm. The estimation network achieves this by utilizing a multi-layer neural network to predict the mixture membership of each center block image x given its corresponding context representation c. Given the low-dimensional representations z and an integer K as the number of mixture components, the estimation network makes membership prediction as follows.

$$p = MLN(z; \theta(c, x')); \quad \phi = \text{softmax}(p); \tag{4}$$

where z only includes Z_1 731, E_1 761, and E_2 762 in FIG. 7 (with Z_2 removed), and φ is a K-dimensional vector for the soft mixture-component membership prediction, and p is the output of a multi-layer network parameterized by θ(c, x'), and c is the context representation and x' is the whole cropped image. In another word, the context representation c and the whole cropped image are used to generate the parameters of MLN for predicting the mixture coefficients of z. Given a batch of N samples (center block images along their contexts) and their membership predictions, we can further estimate the parameters of the CGMM by optimizing the following loss with three terms, $$\frac{1}{N} \sum_{i=1}^{N} L(x_i, \hat{x}_i) + \frac{\lambda_1}{N} \sum_{i=1}^{N} E(z_i) + \lambda_2 \text{Entropy}(\Phi)$$

where E(z) is defined as follows, $$E(z) = -\log \left( \sum_{k=1}^{K} \hat{\phi}_k \frac{-\frac{1}{2}(z - \hat{u}_k)^T \hat{\Sigma}_k^{-1}(z - \hat{u}_k)}{\sqrt{|2\pi| \hat{\Sigma}_k}} \right)$$

Given the estimated parameters, sample energy E(z) can be further inferred by the log-likelihood equation above (781 in FIG. 8). In addition, during the testing phase with the learned CGMM parameters, we calculate the energy of each test sample and predict samples of high energy as anomalies by a pre-chosen threshold. Besides calculating the test sample energy for anomaly detection, the Recon Err E_2

762 in FIG. 8 can also be used with an additional pre-chosen threshold creating a composite rule for anomaly detection in some cases.

Although a contextual autoencoder has been developed for anomaly detection, incorporating context-dependent density estimation into the system and using context representations to generate network parameters of both the autoencoder and the CGMM are new in this invention.

Figure 9:
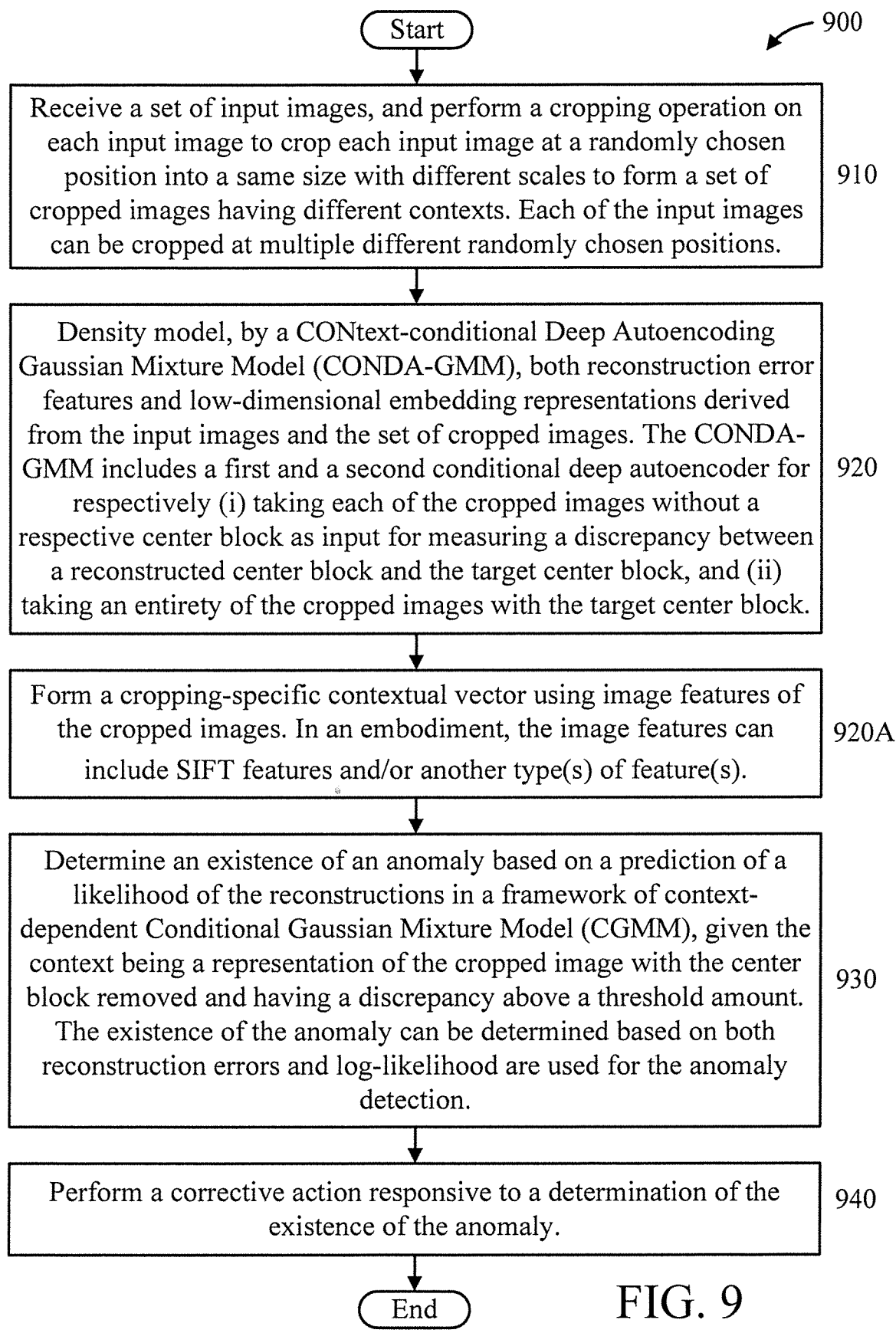
FIG. 9 is a flow diagram showing an exemplary system/method for unsupervised image-based anomaly detection using a multi-scale context-dependent deep autoencoding Gaussian Mixture Model (GMM), in accordance with an embodiment of the present invention.

FIG. 9 is a flow diagram showing an exemplary system/method 900 for unsupervised image-based anomaly detection using a multi-scale context-dependent deep autoencoding Gaussian Mixture Model (GMM), in accordance with an embodiment of the present invention.

At block 910, receive a set of input images, and perform a cropping operation on each of input images to crop each of the input images at a randomly chosen position into a same size with different scales to form a set of cropped images having different contexts. In an embodiment, each of the input images can be cropped at multiple different randomly chosen positions.

At block 920, density model, by a CONtext-conditional Deep Autoencoding Gaussian Mixture Model (CONDA-GMM), both reconstruction error features and low-dimensional embedding representations derived from the input images and the set of cropped images. The CONDA-GMM includes a first and a second conditional deep autoencoder for respectively (i) taking each of the cropped images without a respective center block as input for measuring a discrepancy between a reconstructed center block and the target center block, and (ii) taking an entirety of the cropped images with the target center block.

In an embodiment, block 920 can include block 920A.

At block 920A, form a cropping-specific contextual vector using image features of the cropped images. In an embodiment, the image features can include Scale Invariant Feature Transformation (SIFT) features and/or another type(s) of feature(s). In an embodiment, the image features forming the cropping-specific contextual vector can include edges of the cropped images, where the cropped edges have been cropped to be without a center region.

At block 930, determine an existence of an anomaly based on a prediction of a likelihood of the reconstructions in a framework of context-dependent Conditional Gaussian Mixture Model (CGMM), given the context being a representation of the cropped image with the center block removed and having a discrepancy above a threshold amount. In an embodiment, the existence of the anomaly can be determined based on both reconstruction errors and log-likelihood are used for the anomaly detection.

At block 940, perform a corrective action (e.g., discarding the product, replacing a defective one with a subsequent non-defective one, stopping the production line, and so forth) responsive to a determination of the existence of the anomaly.

A further description will now be given of some of the many attendant advantages of the present invention.

The present invention can effectively identify both local defects such as appearance defects based on reconstruction errors and partial structural distortion defects.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A false alarm reduction system for reducing false alarms in an automatic defect detection system, the false alarm reduction system comprising:
a processor for performing a cropping operation on each of input images at randomly chosen positions to form a set of cropped images of a same size at different scales in different contexts; and a CONtext-conditional Deep Autoencoding Gaussian Mixture Model (CONDA-GMM), having a first and a second conditional deep autoencoder for respectively (i) taking each of the cropped images without a respective center block as input for measuring a discrepancy between a reconstructed center block and the target center block, and (ii) taking an entirety of the cropped images with the target center block, the CONDA-GMM constructing density estimates based on both reconstruction error features and low-dimensional embedding representations derived from encodings of the cropped images, wherein the processor determines an existence of an anomaly based on a prediction of a likelihood of the anomaly existing in a framework of a context-dependent Conditional Gaussian Mixture Model (CGMM), given the context being a representation of the cropped image with the center block removed and having a discrepancy above a threshold amount.

2. The false alarm reduction system of claim 1, wherein the CONDA-GMM comprises a context-dependent deep autoencoding compression network and a context-dependent density estimation network.

3. The false alarm reduction system of claim 1, wherein each of the input images is cropped at multiple different randomly chosen positions.

4. The false alarm reduction system of claim 1, wherein a cropping-specific contextual vector is formed using image features of the cropped images.

5. The false alarm reduction system of claim 4, wherein the image features comprise Scale Invariant Feature Transformation (SIFT) features.

6. The false alarm reduction system of claim 4, wherein the image features forming the cropping-specific contextual vector comprise edges of the cropped images, wherein the cropped edges have been cropped to be without a center region.

7. The false alarm reduction system of claim 1, wherein the CONDA-GMM includes a first and a second conditional deep autoencoder for respectively taking each of the cropped images without a respective center block as input for measuring a discrepancy between a reconstructed center block and the target center block, and taking an entirety of the cropped images with the target center block.

8. The false alarm reduction system of claim 1, wherein the likelihood is based on an energy level.

9. The false alarm reduction system of claim 1, wherein both reconstruction errors and log-likelihood are used for the anomaly detection.

10. The false alarm reduction system of claim 1, further comprising a Multi-Layer Perceptron, predicting an input-specific mixture coefficient conditioned on the representation.

11. A false alarm reduction method for reducing false alarms in an automatic defect detection system, the false alarm reduction method comprising:

performing, by a processor, a cropping operation on each of input images at randomly chosen positions to form a set of cropped images of a same size at different scales in different contexts;

encoding, by a first conditional deep autoencoder of a CONtext-conditional Deep Autoencoding Gaussian Mixture Model (CONDA-GMM), each of the cropped images without a respective center block as input for measuring a discrepancy between a reconstructed center block and the target center block, and encoding, by a second conditional deep autoencoder of the CONDA-GMM, an entirety of the cropped images with the target center block;

constructing, by the CONDA-GMM, density estimates based on both reconstruction error features and low-dimensional embedding representations derived from encodings of the cropped images; and determining, by the processor, an existence of an anomaly based on a prediction of a likelihood of the anomaly existing in a framework of a context-dependent Conditional Gaussian Mixture Model (CGMM), given the context being a representation of the cropped image with the center block removed and having a discrepancy above a threshold amount.

12. The false alarm reduction method of claim 11, wherein the CONDA-GMM comprises a context-dependent deep autoencoding compression network and a context-dependent density estimation network.

13. The false alarm reduction method of claim 11, wherein each of the input images is cropped at multiple different randomly chosen positions.

14. The false alarm reduction method of claim 11, further comprising forming a cropping-specific contextual vector using image features of the cropped images.

15. The false alarm reduction method of claim 14, wherein the image features comprise Scale Invariant Feature Transformation (SIFT) features.

16. The false alarm reduction method of claim 14, wherein the image features forming the cropping-specific contextual vector comprise edges of the cropped images, wherein the cropped edges have been cropped to be without a center region.

17. The false alarm reduction method of claim 11, wherein the CONDA-GMM includes a first and a second conditional deep autoencoder for respectively taking each of the cropped images without a respective center block as input for measuring a discrepancy between a reconstructed center block and the target center block, and taking an entirety of the cropped images with the target center block.

18. The false alarm reduction method of claim 11, wherein the likelihood is based on an energy level.

19. The false alarm reduction method of claim 11, wherein both reconstruction errors and log-likelihood are used for the anomaly detection.

20. The false alarm reduction method of claim 11, further comprising predicting, by a Multi-Layer Perceptron, an input-specific mixture coefficient conditioned on the representation.

* * * * *